United States Patent [19]
Borghi et al.

[11] Patent Number: 5,612,610
[45] Date of Patent: Mar. 18, 1997

[54] DC-TO-DC CONVERTER OPERATING IN A DISCONTINUOUS MODE

[75] Inventors: Maria R. Borghi, Marcallo con Casone; Pietro Menniti, Milan, both of Italy

[73] Assignee: SGS-Thomson Microelectronics S.r.l, Agrate Brianza, Italy

[21] Appl. No.: 328,232

[22] Filed: Oct. 24, 1994

[30] Foreign Application Priority Data

Oct. 22, 1993 [IT] Italy .................. VA93A0024

[51] Int. Cl.⁶ .................................. G05F 1/613
[52] U.S. Cl. .................... 323/222; 323/284; 323/285; 323/287
[58] Field of Search .................. 323/222, 282, 323/283, 284, 285, 287, 288

[56] References Cited

U.S. PATENT DOCUMENTS

| | | | |
|---|---|---|---|
| 5,003,454 | 3/1991 | Bruning | 323/222 X |
| 5,170,333 | 12/1992 | Niwayama | 363/21 |
| 5,247,239 | 9/1993 | Yamamura et al. | 323/272 |
| 5,359,281 | 10/1994 | Barrow et al. | 323/284 |
| 5,367,247 | 11/1994 | Blocher et al. | 323/222 |
| 5,502,370 | 3/1996 | Hall et al. | 323/284 |

FOREIGN PATENT DOCUMENTS

| | | |
|---|---|---|
| 386980 | 12/1990 | European Pat. Off. . |
| 436980 | 7/1991 | European Pat. Off. . |
| 3801399 | 3/1989 | Germany . |
| 3914069 | 10/1990 | Germany . |
| 4136809 | 5/1992 | Germany . |

*Primary Examiner*—Peter S. Wong
*Assistant Examiner*—Y. J. Han
*Attorney, Agent, or Firm*—David V. Carlson; Seed and Berry LLP

[57] ABSTRACT

A converter employs a comparator sensing the current through an output diode, for generating a confirmation signal of an OFF state of the switch until the discharge current of the inductor toward the user circuit and the external filter capacitance has become null, thus ensuring the operation in a discontinuous mode under any condition. A turn-off signal of the switch is provided by another comparator which, instead of the voltage on a sensing resistance connected in series with the switch, may sense the voltage across the switch itself. This latter embodiment is particularly suited in case of an output MOS transistor and the circuit comprises means for masking for a preset period of time the turn-off signal produced by said comparator, in order to allow a predefined turn-on phase of the switch. Enabling of the turn-on of the switch is conventionally provided by a dedicated (third) comparator of the output voltage. The circuit does not require the use of an error amplifier, for the compensation of which special complex integratable circuits or alternatively access to the output node of the error amplifier through a dedicated pin may be needed. Neither a local oscillator for turning off the switch is needed. The circuit is simple and suited for integration in large complex system chips, where there is a limited availability of pins and silicon area. Different embodiments are described.

46 Claims, 5 Drawing Sheets

DC-TO-DC CONVERTER OPERATING IN A DISCONTINUOUS MODE

BACKGROUND AND SUMMARY OF THE INVENTION

The present invention relates to a DC-to-DC static converter, operating in a discontinuous mode, particularly suited to be integrated in a multisystem chip.

In electronic systems it is often necessary to make available a stabilized DC voltage of a higher value than the DC supply voltage (VCC), which may or may not be stabilized. A particular voltage boosting converter circuit is employed for this purpose, the power circuit of which comprises an inductor connected to the DC supply bus and driven by a low-side driver (switch) to cyclically charge, a recirculation diode for discharging the energy stored in the inductor during a cyclic connection to ground through the switch and a filter capacitor connected between output node and ground. Control and regulation of the voltage on the output node is implemented by a control circuit that controls the turn-on and the turn-off of the switch.

In other applications, it may be necessary to make available a stabilized DC voltage lower than a stabilized or unstabilized DC voltage present on a power supply line. In this case, a step-down DC-to-DC converter, for example a so-called buck converter is used. The literature on these converter circuits is conspicuous and well known. The volume "Switch Mode Power Supply Handbook" by Keith Billings, which is hereby incorporated by reference, contains a broad review of these circuits under chapter 20, entitled "DC-to-DC Switching Regulators". The control system of these converter circuits may be based upon the regulation of the duty-cycle of the switching of the power switch which is driven at a timing frequency established by a local oscillator or derived from a general system's clock frequency (that is a PWM control system) or hysteretically in function of the output voltage. The mode of operation of the converter may also be continuous or discontinuous. In a continuous mode of operation, the inductor is always crossed by an electric current, that is the switch commutes again before the discharge current of the inductance toward the user circuit, through the discharge (recirculation) diode, becomes null. Conversely, in the case of a discontinuous mode of operation, the switch is activated again only after the discharge current of the inductance has become null.

Commonly, the continuous mode of operation is preferred for relatively high power systems, or when it is important to minimize the residual "ripple" on the stabilized output voltage and to keep the intensity of electromagnetic disturbances generated by the switching as low as possible. The discontinuous mode of operation is often preferred in relatively low power systems because it requires a far simpler control circuit.

Converters of this latter type, that is operating in a discontinuous mode, are increasingly integrated in large chips which contain complex electronic systems (or even multiple systems together). In these important areas of application, there is a need to minimize the pins or leads of the integrated device required by the converter circuit for the connection of components that must be necessarily external to the integrated circuit, as for example the inductor, the output buffer (filter) capacitor, and eventual stabilization networks of the control loop. Moreover, the use of miniature external inductors, in the form of "chip-inductor", having a relatively high (parasitic) series resistance and a low saturation current, may, in the case of circuits destined to function with a relatively low supply voltage, provoke missed start up and/or risk situations because of an insufficient limitation of current peaks.

Commonly, the control and regulation circuit of these converters comprises an error amplifier (E/A) capable of comparing the voltage present on the output node with a reference voltage and generating an amplified error signal which is input to a comparator that controls the turn-on and the turn-off of the output power transistor of the converter (that is the closing and opening of the switch that intermittently connects to ground the inductor).

The use of an error amplifier, that is of a high gain stage in the regulation loop, determines the need of employing a stabilization network, which may require access through a dedicated pin or lead of the integrated circuit to the output node of the error amplifier. In complex chips, the number of pins required may not be compatible with a limited overall availability of pins. On the other hand, the realization of integrated stabilization networks (to substitute for the use of external components) requires the integration of complex circuits requiring a substantial area of integration.

A different approach is employed in the integrated device MC34063 of Motorola. According to this known commercial device, the control circuit of the converter does not employ an error amplifier. Of course, since the output capacitor discharges during the turn-off phase of the switching transistor (charge phase of the inductor), the turn-off of the switching transistor cannot be controlled by the comparator that monitors the output voltage of the circuit. In fact the comparator may exclusively control the turn-on of the output transistor, while its turn-off must be controlled by other means. In the MC34063 integrated circuit, the output switching transistor is turned off by employing an oscillator dedicated to this purpose.

The approach adopted in the MC34063 device does not guarantee a discontinuous mode of operation, i.e. does not guarantee the nullifying of the discharge current of the inductor before the turn-on of the output switching transistor (closing of the output power switch). Consequences may include irregular current wave forms in the inductor, an excessive sensitivity to disturbances of the stabilized output voltage, and more generally an undeterminable ripple on the current flowing through the inductor and on the stabilized output voltage.

There is a need for a converter, functioning in a discontinuous mode, whose integration on a chip is simplified by requiring a minimum number of dedicated pins, without requiring the use of a local oscillator (or of frequency divider circuits of a clock frequency available within the chip), and which is compatible with a relatively low supply voltage and with the use of external inductors having a relatively high series resistance (chip-inductor), while permitting the use of an output switching transistor of a field effect type in order to optimize conversion efficiency.

All these objectives are met by a converter based on a preset and substantially constant interval of conduction of the switching output transistor, which employs a circuit capable of monitoring both the current through the switching power transistor (that is the charge current of the inductor) and the discharge current of the inductor and a logic circuit which guarantees a discontinuous mode of operation of the converter. These criteria avoid the need for an error amplifier, which would require access to its output node for realizing the necessary stabilization of the control loop, as well as the need for a local oscillator or frequency divider of a system's clock frequency.

According to a first embodiment of the invention, the turn-off signal is generated by employing a comparator of the voltage present on the output power switch. This avoids using a sensing resistance in series with the output power transistor. Use of either a delay network between the output of a driving flip-flop of the output switching transistor and an input of the logic control circuit, or a different arrangement for masking the voltage on the output switching transistor during an OFF phase thereof, allows a new turn-on of the output switching transistor even if the voltage across its current terminals is not yet above a reference voltage, as will be described more clearly further on this description.

According to a different embodiment of the invention, a turn-off signal of the output switch is obtained by using a comparator monitoring the voltage on a sensing resistance, purposely connected in series with the output power transistor.

In practice, the choice of one or the other embodiment may be determined by the particular conditions of use of the converter. For example, the output power switch can be realized in the form of a MOS transistor rather than in the form of a bipolar transistor, for reducing energy losses by exploiting the inherently lower on-resistance RON of a MOS transistor as compared with a bipolar transistor of similar current-handling capacity, as well as the non-saturating characteristic and shorter turn-on and turn-off times of the MOS transistor. In this case, the presence of a particularly low supply voltage VCC (e.g. 3 V) may cause precarious start-up conditions of the circuit. In these cases, the absence of a sensing resistance in series with the source of the output MOS transistor may decisively improve the start-up conditions, even with a relatively low supply voltage.

In either case, the circuit of the invention essentially employs three comparators, the output signals of which are handled by a logic circuit which controls a driving flip-flop. Essentially, the only pins required by the converter of the invention are those necessary for connecting the inductor and the output filter capacitor.

BRIEF DESCRIPTION OF THE DRAWING

The disclosed inventions will be described with reference to the accompanying drawings, which show important sample embodiments of the invention and which are incorporated in the specification hereof by reference, wherein.

DETAILED DESCRIPTION OF THE PREFERRED EMBODIMENTS

Figure 1:
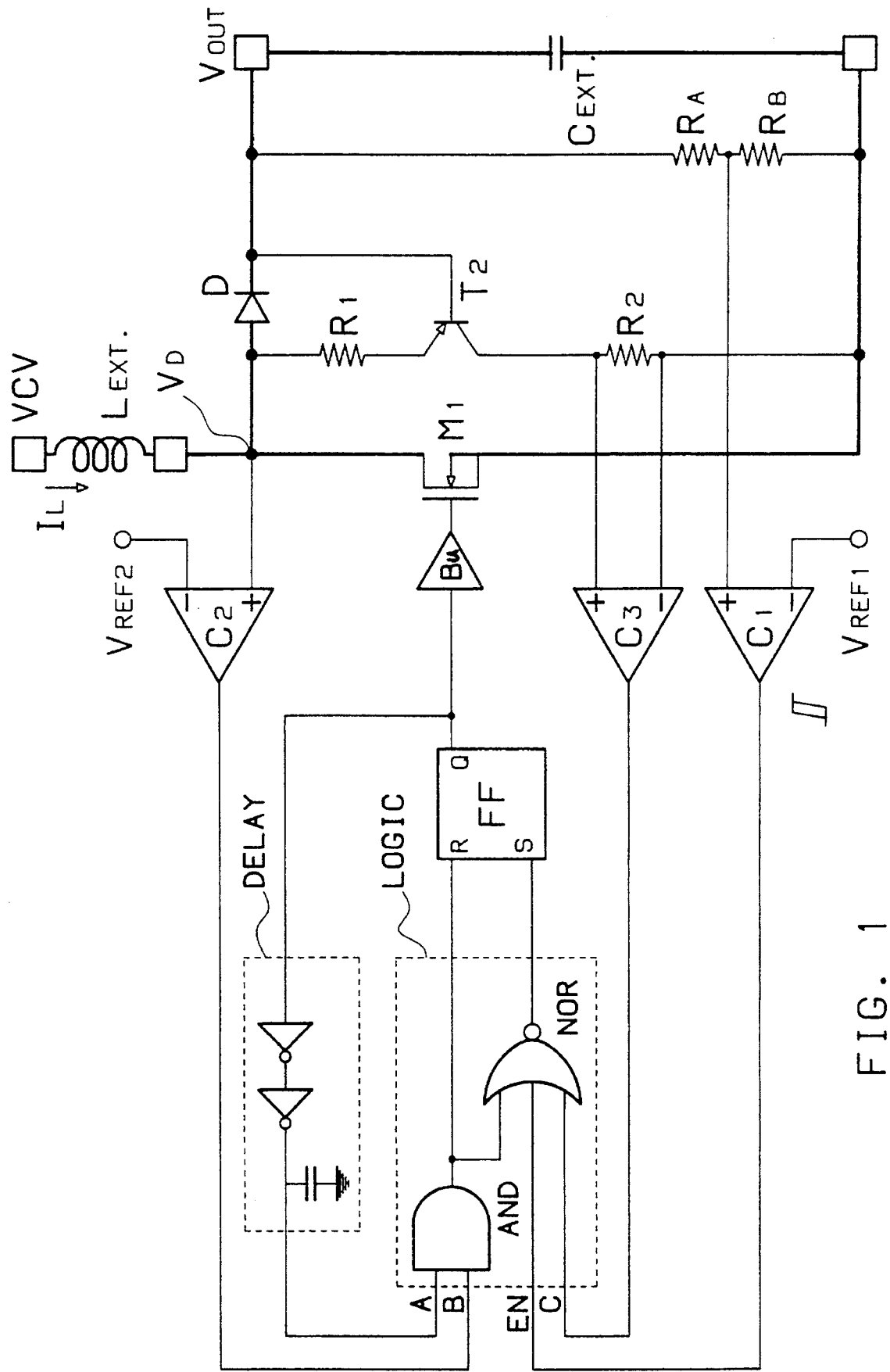
FIG. 1 shows a basic diagram of a converter of the invention, according to a first embodiment.

The numerous innovative teachings of the present application will be described with particular reference to the presently preferred embodiment (by way of example, and not of limitation), in which:

FIG. 1 shows a basic diagram of a converter of the invention, according to a first embodiment.

In all the figures, the power circuit of the converter is indicated by tracing the relative electric paths with thick lines.

Figure 5:
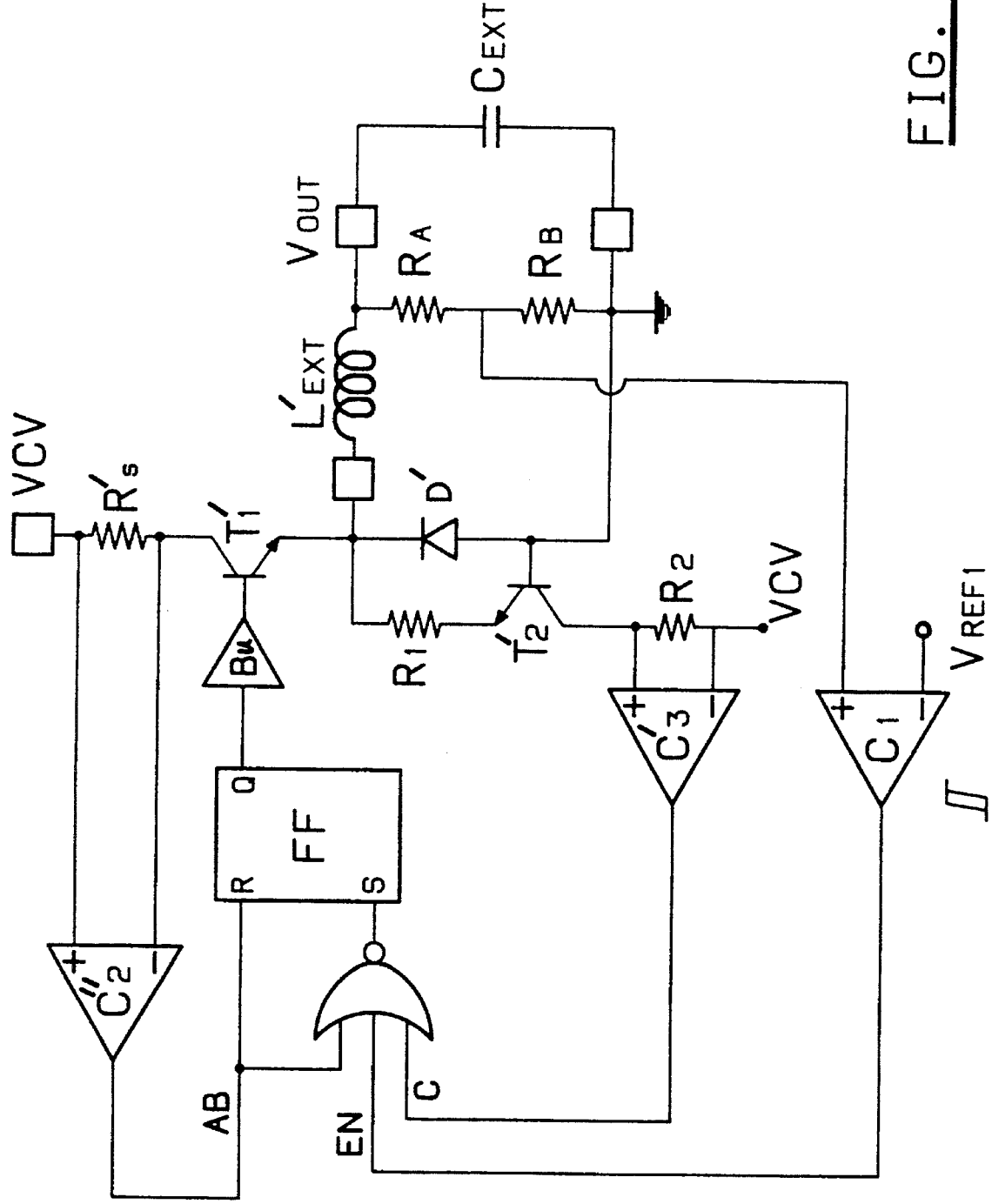
FIG. 5 shows a basic diagram of a step-down (buck) converter made according to the invention.

Most of the embodiments shown in the figures refer to the implementation of a voltage boosting converter. However, as will be evident to one of ordinary skill, the regulation and control circuit of the invention for a discontinuous mode of operation, can be employed also in a step-down converter, for example in a buck converter. Such a different application of the control circuit of the invention is schematically depicted in FIG. 5.

With reference to FIG. 1, upon starting up the circuit, the output power transistor M1 (the output power switch of the functional converter circuit) conducts and the inductor $L_{EXT}$ charges, the voltage $V_D$ on the drain node of the transistor M1 is given by the following expression:

$$V_D = R_{ON} I^L.$$

This voltage $V_D$ is sensed at the non inverting input of the comparator C2.

Upon an increase of the current through M1, the voltage $V_D$ increases and when the latter reaches the value $V_{REF2}$, the comparator C2 commutes its output from "0" to "1", thus bringing to a logic "1" the respective input B of the logic control circuit (LOGIC). The presence of a logic "1" at the input B of the AND gate (whose input A is also at a logic "1"), determines an output configuration of the logic circuit whereby the set (S) and reset (R) inputs of the driving flip-flop FF are forced to "0" and "1" respectively. This causes the switching of the output Q of the FF to "0", which turns off M1.

The diagrams also indicate the presence of a driving buffer stage Bu.

At this point, the voltage on the inductor $LEX_T$ inverts its sign and the energy stored in the inductance discharges on a output capacitor $C_{EXT}$ and on an eventual load (not shown in the figure), through a discharge diode D.

The passage of current through the discharge diode D, monitored by means of R1, T2 and R2 in the form of a voltage drop on R2, is sensed by a third comparator C3, the output of which reveal the passage of current by switching to "1", thus confirming through the input C of the control logic circuit, a logic "0" on the set (S) input of the driving flip-flop FF and preventing the turning-on of M1 until a discharge current of the inductor persists.

According to this embodiment, characterized by the absence of any sensing resistance connected in series with the power switch, after the turn-off of M1, the voltage of $V_D$ remains higher than the reference voltage $V_{REF2}$, therefore the output of the comparator C2 remains high (at "1"). The turning-on again of M1 is made possible by "masking" the persistence on M1 of a relatively high $V_D$, during an OFF phase of M1 commanded by the comparator C2 and confirmed by the comparator C3.

The "masking" of the logic "1" persisting at the output of the comparator C2 during an OFF phase of M1 (also present at the input B of the AND gate of the control logic circuit), may be performed by employing a feedback line constituted by a suitable DELAY circuit functionally connected between the Q output of the flip-flop FF and the A input of the control logic circuit. The delay circuit may be composed of two inverters in cascade and by a capacitance that can be charged and discharged through the inverters, as shown in the example of FIG. 1. Through the input A, the output of the AND gate and therefore the reset input R of the FF and the relative input of the NOR gate are forced to "0", after a preset delay time following the switching to "0" (turn-off of M1) of the output Q of the driving flip-flop FF. The delay is designed to be sufficient to ensure a complete turn-off of M1 and confirmation of the "0" state of the set input (S) of the flip-flop FF by the comparator C3.

If the output voltage, monitored at the non inverting input of the comparator C1, remains or becomes lower than the reference voltage $V_{REF1}$, the output of the comparator C1, connected to the input EN of the control logic circuit, that is to an input of the NOR gate, is at "0". Therefore, the set input S of FF commutes to "1" and so does the output Q, thus turning M1 on again. After a delay time, also the input A of the AND gate goes to "1", however in the meantime the voltage $V_D$ will have dropped below $V_{REF2}$, therefore the input B will become "0" and the output of the AND gate connected to the reset terminal R of the FF remains at "0", thus maintaining M1 in an ON state. The delay by which the input A commutes from "1" to "0", allows masking eventual oscillations that could occur on the drain voltage $V_D$ of M1, at the moment of its turning on again and therefore prevents an anticipated turning off and possible multiple spurious switching. Spurious switching in general do not impair the operation of the converter but cause an increase of power dissipation and for this reason are advantageously prevented.

Alternatively, for achieving the same result of effectively masking the persistence of a relatively high voltage signal on the $V_D$ node of the output switching transistor during an off phase of the latter, instead of employing an AND gate and suitably delayed feedback signal, as in the embodiment depicted in FIG. 1, the same driving logic signal present on the output Q of the driving flip-flop FF may be employed for switching to ground the non inverting input of the comparator C2.

Figure 2:
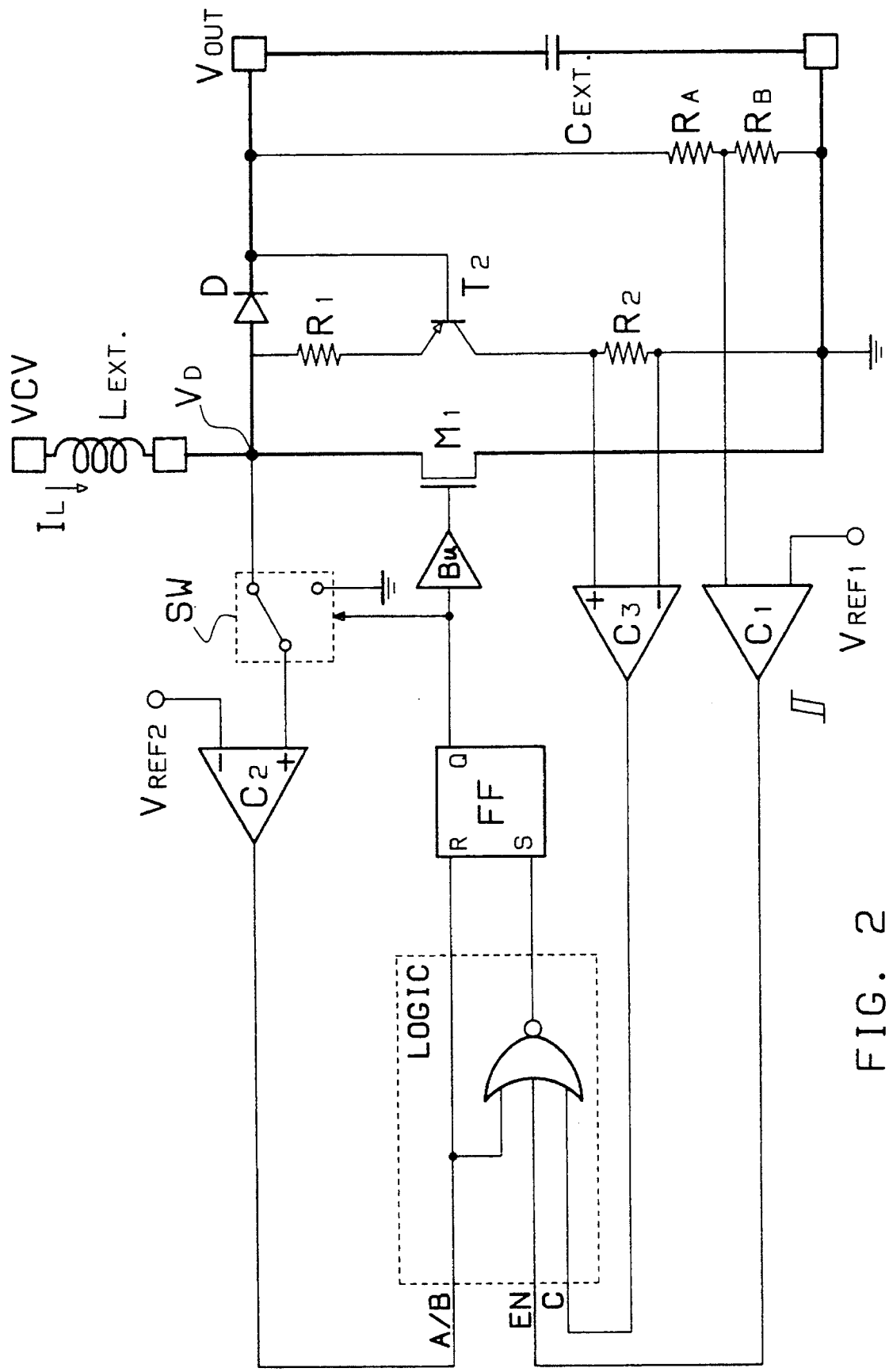
FIG. 2 shows a diagram of a converter according to an alternative embodiment.

This alternative embodiment is diagrammatically depicted in FIG. 2. According to this embodiment, the non inverting input of the comparator C2 is switched to the drain node of the output transistor M1 when the latter is conducting. When the voltage $V_D$ becomes higher than the reference voltage VREF2, the comparator C2 commutes to "1". The output Q of the driving flip-flop FF switches to "0", thus turning off the transistor M1 and, simultaneously, drives the switch SW which switches to ground the non inverting input of the comparator C2. After a certain delay, this causes a new change of state of the comparator C2, which eventually permits the turning on again of the output transistor M1, depending on the state of the other control signals, EN and C.

Figure 3:
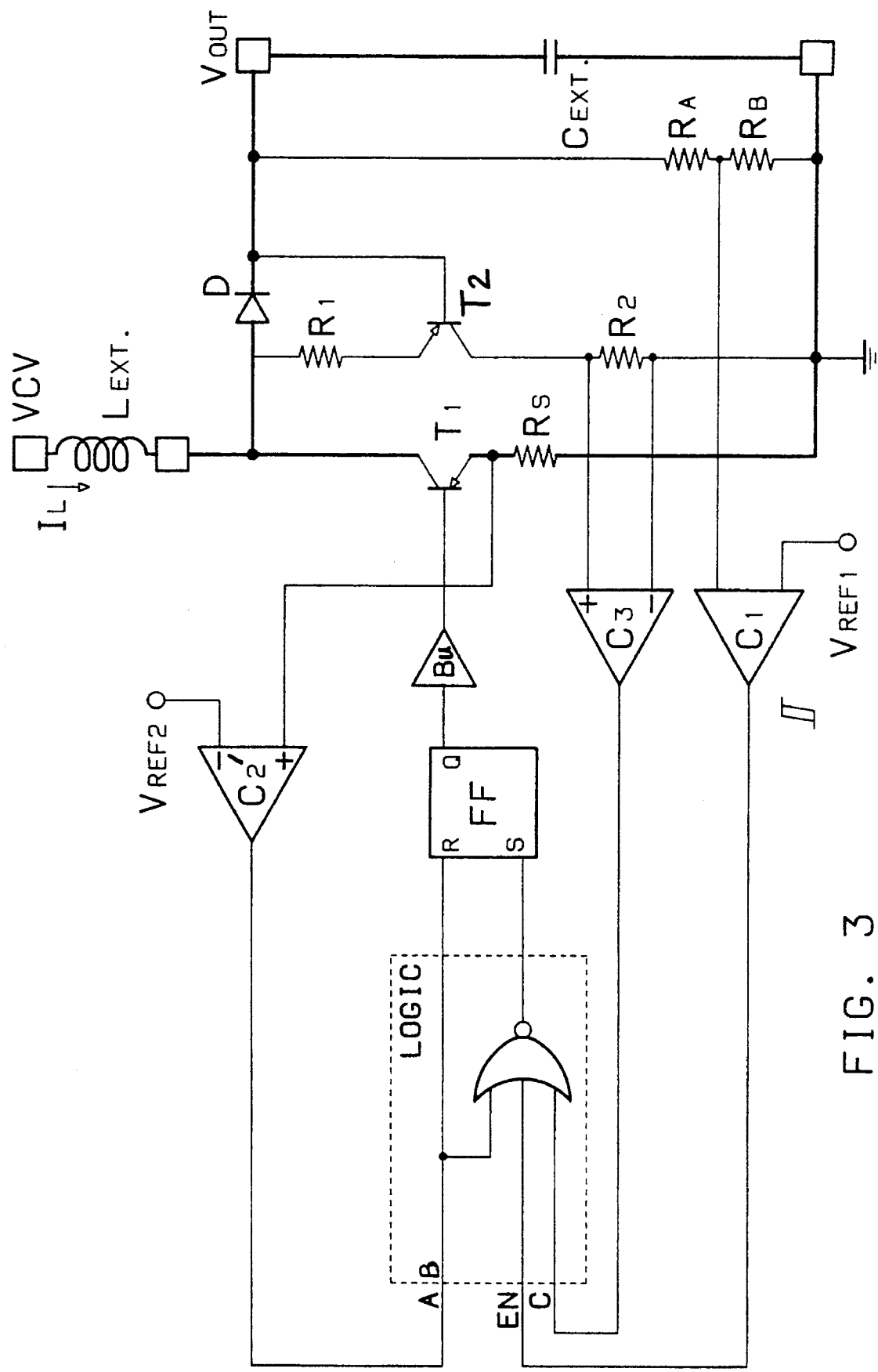
FIG. 3 shows a diagram of a converter according to a further embodiment.

If a sensing resistance is connected in series with the output switch M1, for deriving a signal which is applied to the non inverting input of the comparator C2', the above described masking arrangements are obviously unnecessary. This alternative embodiment of the invention is depicted in FIG. 3. A bipolar output transistor T1 is used in the example shown and a sensing resistance Rs is connected in series with the emitter thereof. According to this alternative embodiment of the circuit of the invention, the comparator C2' monitors the voltage on the sensing resistance Rs and therefore, when the output transistor T1 is OFF, the non inverting input of the comparator C2' is at "0", thus eliminating the need for a delayed feedback line for permitting the turn-on of the output transistor.

In fact, once the inductor has been charged, the output of the comparator C2' commutes to "0", therefore the single NOR gate, which in this embodiment constitutes the control logic circuit, has its inputs A/B and C both at "0". This allows turning on again the output transistor T1 when also the input EN is goes to "0".

Of course, in case of a step-down converter, the sensing resistance will be connected in series with the collector T1 instead of with its emitter as in the boost converter of FIG. 3.

In either embodiment of the control circuit, the input EN of the control logic circuit is driven by the output of the comparator C1, which monitors the output voltage VOUT through the voltage divider RA and RB. In practice, as long as the output voltage VOUT remains higher than a certain value, set by means of the reference voltage $V_{REF1}$, the turn-on of the output transistor (M1 or T1) is prevented in all cases, to be enabled again when the output of C1 commutes to "0" and the set input S of the driving flip-flop FF commutes to "1", thus commuting to "1" the output Q. In a discontinuous mode the turning on of M1 causes the inductor to charge again, thus initiating a new phase of fast alternate turn-ons and turn-offs (i.e. burst).

Advantageously, the comparator C1 may be provided with a certain hysteresis in order to ensure an absolute stability of the system even in the presence of a high level of electromagnetic disturbances, which could cause spurious oscillations.

Moreover, the reference voltage $V_{REF1}$ of the comparator C1 may be constant or made to vary with the supply voltage, that is equal to K(VCC+Delta V), where Delta V is an overvoltage necessary for a high-side driver, using an output MOS transistor. In this way, instead of implementing a voltage boosting converter having a constant (stabilized) output voltage, a voltage boosting converter suitable to provide an output voltage equal to the sum of the supply voltage plus a certain pre-established overvoltage, as often required in specific applications, may be realized. This has the advantage of making additional clamp circuits unnecessary.

Figure 4:
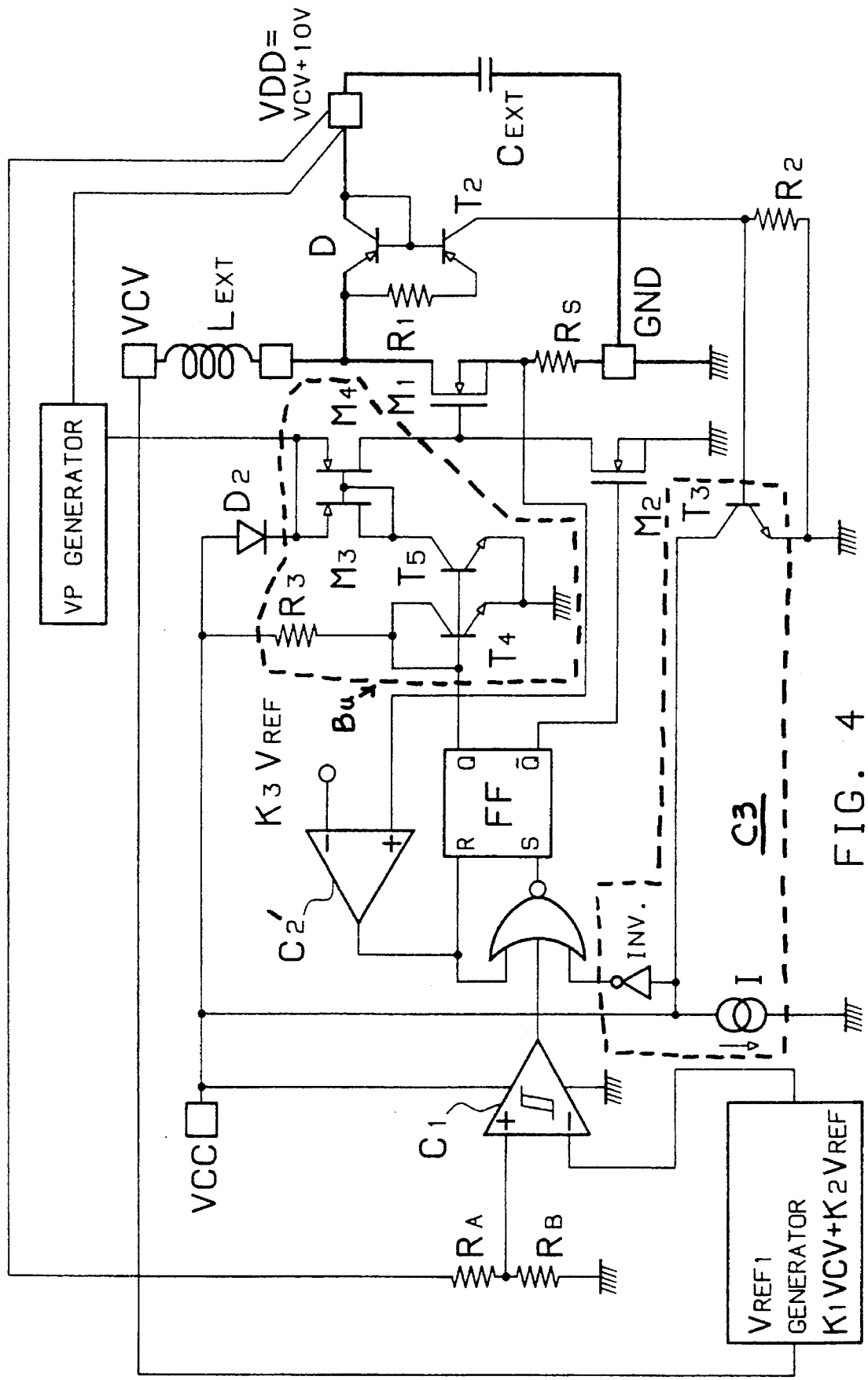
FIG. 4 shows an electrical diagram of a converter made according to the basic diagram of FIG. 3.

Another innovative circuit embodiment is shown in FIG. 4. Upon starting up the circuit, the driving of the output transistor M1 to a conducting state is ensured by the diode D2 and the transistor M4, using the supply voltage VCC in this start-up phase of the converter.

In many cases, driving M1 with a gate voltage equivalent to the supply voltage VCC (which may be relatively low, for example between 3 and 4 V) may not be satisfactory for ensuring a low ON resistance of the output MOS transistor M1, which may need a gate voltage of at least 10 V for significantly reducing its internal resistance.

On the other hand, the output voltage $V_{DD}$ of the converter may be designed for a steady state value that could be excessively high to be directly used for overdriving the output transistor M1. In the example given, the steady state output voltage $V_{DD}$ is equal to the sum of the voltage VCV of the power supply bus (which may vary from 4 V to 12 V), plus a pre-established overvoltage of 10 V. In an application of this type, the innovative circuit may be provided with a circuit block for generating an intermediate voltage VP of about 10 V for overdriving the output transistor M1, as shown in FIG. 4. In fact, after the converter has reached a steady state, the diode D2 ceases to conduct, thus decoupling the driving stage of the output transistor M1, which functions at an intermediate voltage $V_D$ of about 10 V, as provided by the dedicated block VP GENERATOR.

A driving buffer Bu of the output transistor M1 may be coinposed of a first transistor T4 (current generator) for establishing a certain bias current through the resistance R3 connected to VCC. The current generator T4 is controlled by the signal present on the output Q of the driving flip-flop FF. The current generated by T4 is mirrored through T5 in M3 and from M3 onto M4 and therefore charges the gate node of M1.

The MOS transistor M2, driven by the signal present on the output Q of the flip-flop FF, has the function of quickly discharging the capacitance of the gate node of the output transistor M1 at the turn-off instant.

The current flow through the diode D is sensed by mirroring in a suitable ratio the current flowing through the diode D on the transistor T2. Compression of the current signal may also be incremented by using a resistance R1 of an appropriate value. The current mirrored on T2 is converted in a voltage signal on the resistance R2. In the example shown in FIG. 4, the comparator C3 of the functional diagrams of FIGS. 1, 2 and 3 is made of a transistor T3 and a current generator I suitable to charge the input node of an inverter INV. When T3 is switched off, the discharge path to ground of the input node of the inverter INV is blocked.

Optionally, the external filter capacitor $C_{EXT}$ of the converter can be connected to the supply node VCC instead of the ground node, thus reducing the turn-on transient time. In fact, at start up, the voltage swing on the output node may in this case start from VCC instead than from a null value.

A sample embodiment has been realized with the following values: Lext=220 μH; RA=195 KΩ and RB=15 KΩ; Cext=10 μF; R=10 Ω and R2=100 KΩ. However, of course, these may be varied over a wide range, as will be apparent to anyone of ordinary skill in the art.

The converter of the invention fully satisfies the stated requirements and objectives while requiring a minimum number of dedicated pins or leads and by ensuring, with a relatively simple circuit, an intrinsically very stable discontinuous mode of operation of the converter. The circuit possesses an intrinsic current limiting ability and therefore does not require soft-start devices. The circuit is particularly suited for integration in multifunctional chips requiring an internal voltage step-up circuit.

The circuit of the invention may use chip-inductor type coils, which are particularly advantageous for their low cost and small dimensions which permit a surface mounting thereof. These coils are characterized by a relatively high parasitic series resistance and by a relatively low saturation current. The converter circuit of the invention, having an intrinsically controlled peak current, is particularly suited for the use of such micro-coils.

A step-down or so-called buck converter, employing the control and regulating circuit of the invention is schematically depicted in FIG. 5. The functional elements that form the converter circuit are labelled analogously to those shown in the boost converter of FIG. 3. Thus, the inductor $L_{EXT}$' is connected in series to the output, the power transistor T1' and sense resistor Rs' are connected between node VCV and the inductor, the diode D' is connected to ground, and the transistor/resistor combination T2'/R2' (which senses the current through D') is connected to VCV rather than ground, and the voltage on R2' is sensed by comparator $C_2$". The operation of the control circuit of the invention is substantially the same and a reiterated description thereof is superfluous.

According to a disclosed class of innovative embodiments, there is provided: A voltage boosting circuit, operable from first and second supply voltages, said first supply voltage being a positive supply voltage and said second supply voltage connection providing a chip ground, comprising: a first node connectable to said first supply voltage through an external inductor; a switching transistor connected to connect said first node to said second power supply voltage; an output diode, interposed between said first node and an output node; a first comparator connected to monitor the voltage of said output node, a second comparator connected to monitor the voltage of said first node; a third comparator connected to monitor the current through the output diode; logic connected to intermittently turn on said switching transistor for a duration determined by said second comparator and only when said third comparator indicates that current through said inductor and said output diode has ceased while said first comparator indicates that additional current through said output diode is needed; whereby said output node provides a third power supply voltage which is not equal to said first nor to said second supply voltage.

According to another disclosed class of innovative embodiments, there is provided: A voltage boosting circuit, operable from first and second supply voltages, said first supply voltage being a positive supply voltage and said second supply voltage connection providing a chip ground, comprising: a first node connectable to said first supply voltage through an external inductor; a connection for providing a gate drive signal to a switching transistor which can selectively connect said first node to said second power supply voltage; connections for providing an output diode which is interposed between said first node and an output node; a first comparator connected to monitor the voltage of said output node, a second comparator connected to monitor the voltage of said first node; a third comparator connected to monitor the current through the output diode; logic connected to intermittently turn on said switching transistor for a duration determined by said second comparator and only when said third comparator indicates that current through said inductor and said output diode has ceased while said first comparator indicates that additional current through said output diode is needed; whereby said output node provides a third power supply voltage which is not equal to said first nor to said second supply voltage.

According to another disclosed class of innovative embodiments, there is provided: A voltage boosting circuit, operable from first and second supply voltage connections, said first supply voltage being a positive supply voltage and said second supply voltage connection providing a chip ground, comprising: a first node connectable to said first supply voltage through an external inductor; a switching transistor connected to connect said first node to said second power supply voltage; an output diode, interposed between said first node and an output node; a first comparator connected to monitor the voltage of said output node, a second comparator connected to monitor the voltage of said first node; a third comparator connected to monitor the current through the output diode; logic connected to intermittently turn on said switching transistor to store energy in the magnetic field of said inductor, but only when said third comparator indicates that current through said inductor and said output diode has ceased; whereby said output node provides a third power supply voltage which is greater than said first supply voltage.

According to another disclosed class of innovative embodiments, there is provided: A voltage boosting circuit, operable from first and second supply voltage connections, said first supply voltage being a positive supply voltage and said second supply voltage connection providing a chip ground, comprising: a first node connectable to said first supply voltage through an external inductor; a switching transistor connected to connect said first node to said second power supply voltage; an output diode, interposed between said first node and an output node; a first comparator connected to monitor the voltage of said output node, a second comparator operatively connected to monitor the current through said switching transistor; a third comparator connected to monitor the current through the output diode; logic connected to intermittently turn on said switching transistor to increase the voltage drop across said inductor, but only when said third comparator indicates that current through said inductor and said output diode has ceased; whereby said output node provides a third power supply voltage which is greater than said first supply voltage.

According to another disclosed class of innovative embodiments, there is provided: A buck conversion circuit, operable from first and second supply voltages, comprising: a series combination of a switching transistor and an output diode, defining a first node at a connection thereof, and connected between said first and second supply voltages; an external inductor operatively connected between said first node and an output node; a first comparator operatively connected to monitor the voltage of said output node, a second comparator operatively connected to monitor the current through said switching transistor; a third comparator operatively connected to monitor the current through the output diode; and logic connected to intermittently turn on said switching transistor to increase the back voltage of said inductor, but only when said third comparator indicates that current through said output diode has ceased; whereby said output node provides a third power supply voltage which is intermediate between said first and second supply voltages, while avoiding excess power consumption.

According to another disclosed class of innovative embodiments, there is provided: A DC-to-DC converter, connected to receive power from two supply connections and to provide a power supply on an output node at a voltage different from both the power supply connections, comprising an inductor driven by a switch to cyclically charge, a discharge diode of the energy stored in the inductor on an output node, a capacitor connected between the output node and one or the other of the supply rails, and a control circuit for regulating the output voltage, which comprises a first comparator of the output voltage enabling and disabling the closing of said switch depending on whether the output voltage is lower or higher than a reference voltage and means, for controlling the switching of said enable-able switch, which comprises a second comparator of the voltage across said switch, generating a turn-off signal when said voltage rises above a preset value; a third comparator of the discharge current of the inductor through said diode, generating a confirmation signal of an OFF state of said switch until the current through said diode has become null; and means for masking said turn-off signal until turn-on of said switch is enabled by said first comparator.

According to another disclosed class of innovative embodiments, there is provided: A DC-to-DC converter having a power circuit comprising an inductor driven by a switch to cyclically charge, a discharge diode of the energy stored in the inductor on an output node and a capacitor connected between the output node and one or the other of the supply rails, and a control circuit for regulating the output voltage, which comprises at least a first comparator of the output voltage enabling and disabling the closing of said switch depending on whether the output voltage is lower or higher than a reference voltage and means for controlling of said enable-able switch, characterized in that said means comprise a second comparator of the voltage on a sensing resistance connected in series with said switch with a reference voltage, generating a turn-on or turn-off signal of said switch; a third comparator of the discharge current of the inductor through said diode, generating a confirmation signal of a turn-off state of the switch until the current through the diode has become null; the output signal of said three comparators being input to a NOR gate, having an output connected to a set input of a driving flip-flop of the switch and the signal of said second comparator being directly input to a reset terminal of said driving flip-flop.

According to another disclosed class of innovative embodiments, there is provided: A method for operating a voltage conversion circuit to generate on an output node a third power supply voltage from first and second power supply voltages, using an inductor, a switching transistor configured to drive current through said inductor from first and second supply voltages, and an output diode connected between one terminal of said inductor and one of said supply voltages, comprising the steps of: monitoring the voltage of said output node, substantially continually, using a first comparator; monitoring the voltage of a node intermediate between said inductor and said diode, substantially continually, using a second comparator; monitoring the current through the output diode, substantially continually, using a third comparator; intermittently turning on a switching transistor, to increase the voltage drop across said inductor, for a duration determined by said second comparator, only when said third comparator indicates that current through said inductor and said output diode has ceased while said first comparator indicates that additional current through said output diode is needed.

According to another disclosed class of innovative embodiments, there is provided: A method for operating a voltage conversion circuit to generate on an output node a third power supply voltage from first and second power supply voltages, using an inductor, a switching transistor configured to drive current through said inductor from first and second supply voltages, and an output diode connected between one terminal of said inductor and one of said supply voltages, comprising the steps of: monitoring the voltage of said output node, substantially continually, using a first comparator; monitoring the voltage of a node intermediate between said inductor and said diode, substantially continually, using a second comparator; monitoring the current through the output diode, substantially continually, using a third comparator; intermittently turning on a switching transistor, to increase the voltage drop across said inductor, for a duration determined by said second comparator, only when said third comparator indicates that current through said inductor and said output diode has ceased while said first comparator indicates that additional current through said output diode is needed.

As will be recognized by those skilled in the art, the innovative concepts described in the present application can be modified and varied over a tremendous range of applications, and accordingly the scope of patented subject matter is not limited by any of the specific exemplary teachings given.

For example, as shown above, this can be implemented in a buck converter as well as a boosting converter.

For another example, the power transistor can be configured as an external discrete component if desired, in place of the component of the presently preferred embodiment.

In general, the specific circuit implementations can be varied in a tremendous variety of ways, and the scope of the invention is not delimited except by the accompanying claims.

What is claimed is:

1. A voltage boosting circuit, operable from first and second supply voltages, said first supply voltage being a positive supply voltage and said second supply voltage connection providing a chip ground, comprising:

a first node connectable to said first supply voltage through an external inductor;

a switching transistor connected to connect said first node to said second power supply voltage;

an output diode, interposed between said first node and an output node;

a first comparator connected to monitor the voltage of said output node, a second comparator connected to monitor the voltage of said first node;

a third comparator connected to monitor the current through the output diode;

logic connected to intermittently turn on said switching transistor for a duration determined by said second comparator and only when said third comparator indicates that current through said inductor and said output diode has ceased while said first comparator indicates that additional current through said output diode is needed;

whereby said output node provides a third power supply voltage which is not equal to said first nor to said second supply voltage.

2. The circuit of claim 1, wherein said first comparator is hysteretic.

3. The circuit of claim 1, wherein said first supply voltage is a positive supply voltage, and said third supply voltage is more positive than said first supply voltage.

4. The circuit of claim 1, wherein said third supply voltage is not intermediate between said first and second supply voltages.

5. The circuit of claim 1, wherein said first supply voltage is a positive supply voltage, and said switching transistor is a DMOS transistor, and said driving buffer stage comprises an output stage powered at a higher voltage than said first supply voltage.

6. The circuit of claim 1, further comprising circuitry for switching said second capacitor in a feedback relation to provide constant-pulse-width control signals to said switching transistor.

7. A voltage boosting circuit, operable from first and second supply voltages, said first supply voltage being a positive supply voltage and said second supply voltage connection providing a chip ground, comprising:

a first node connectable to said first supply voltage through an external inductor;

a connection for providing a gate drive signal to a switching transistor which can selectively connect said first node to said second power supply voltage;

connections for providing an output diode which is interposed between said first node and an output node;

a first comparator connected to monitor the voltage of said output node, a second comparator connected to monitor the voltage of said first node;

a third comparator connected to monitor the current through the output diode;

logic connected to intermittently turn on said switching transistor for a duration determined by said second comparator and only when said third comparator indicates that current through said inductor and said output diode has ceased while said first comparator indicates that additional current through said output diode is needed;

whereby said output node provides a third power supply voltage which is not equal to said first nor to said second supply voltage.

8. The circuit of claim 7, wherein said first comparator is hysteretic.

9. The circuit of claim 7, wherein said first supply voltage is a positive supply voltage, and said third supply voltage is more positive than said first supply voltage.

10. The circuit of claim 7, wherein said third supply voltage is not intermediate between said first and second supply voltages.

11. The circuit of claim 7, wherein said first supply voltage is a positive supply voltage, and said switching transistor is a DMOS transistor, and said driving buffer stage comprises an output stage powered at a higher voltage than said first supply voltage.

12. The circuit of claim 7, further comprising circuitry for switching said second capacitor in a feedback relation to provide constant-pulse-width control signals to said switching transistor.

13. A voltage boosting circuit, operable from first and second supply voltage connections, said first supply voltage being a positive supply voltage and said second supply voltage connection providing a chip ground, comprising:

a first node connectable to said first supply voltage through an external inductor;

a switching transistor connected to connect said first node to said second power supply voltage;

an output diode, interposed between said first node and an output node;

a first comparator connected to monitor the voltage of said output node, a second comparator connected to monitor the voltage of said first node;

a third comparator connected to monitor the current through the output diode;

logic connected to intermittently turn on said switching transistor to store energy in the magnetic field of said inductor, but only when said third comparator indicates that current through said inductor and said output diode has ceased;

whereby said output node provides a third power supply voltage which is greater than said first supply voltage.

14. The circuit of claim 13, wherein said first comparator is hysteretic.

15. The circuit of claim 13, wherein said switching transistor is a DMOS transistor.

16. The circuit of claim 13, wherein said logic intermittently turns on said switching transistor for durations determined by said second comparator.

17. The circuit of claim 13, wherein said switching transistor is a DMOS transistor, and said driving buffer stage comprises an output stage powered at a higher voltage than said first supply voltage.

18. The circuit of claim 13, further comprising circuitry for switching said second capacitor in a feedback relation to provide constant-pulse-width control signals to said switching transistor.

19. A voltage boosting circuit, operable from first and second supply voltage connections, said first supply voltage being a positive supply voltage and said second supply voltage connection providing a chip ground, comprising:

a first node connectable to said first supply voltage through an external inductor;

a switching transistor connected to connect said first node to said second power supply voltage;

an output diode, interposed between said first node and an output node;

a first comparator connected to monitor the voltage of said output node, a second comparator operatively connected to monitor the current through said switching transistor;

a third comparator connected to monitor the current through the output diode;

logic connected to intermittently turn on said switching transistor to increase the voltage drop across said inductor, but only when said third comparator indicates that current through said inductor and said output diode has ceased;

whereby said output node provides a third power supply voltage which is greater than said first supply voltage.

20. The circuit of claim 19, wherein said first comparator is hysteretic.

21. The circuit of claim 19, wherein said switching transistor is a DMOS transistor.

22. The circuit of claim 19, wherein said logic intermittently turns on said switching transistor for durations determined by said second comparator.

23. The circuit of claim 19, wherein said switching transistor is a DMOS transistor, and said driving buffer stage comprises an output stage powered at a higher voltage than said first supply voltage.

24. The circuit of claim 19, further comprising circuitry for switching said second capacitor in a feedback relation to provide constant-pulse-width control signals to said switching transistor.

25. A buck conversion circuit, operable from first and second supply voltages, comprising:

a series combination of a switching transistor and an output diode, defining a first node at a connection thereof, and connected between said first and second supply voltages;

an external inductor operatively connected between said first node and an output node;

a first comparator operatively connected to monitor the voltage of said output node, a second comparator operatively connected to monitor the current through said switching transistor;

a third comparator operatively connected to monitor the current through the output diode; and logic connected to intermittently turn on said switching transistor to increase the back voltage of said inductor, but only when said third comparator indicates that current through said output diode has ceased;

whereby said output node provides a third power supply voltage which is intermediate between said first and second supply voltages, while avoiding excess power consumption.

26. The circuit of claim 25, wherein said first comparator is hysteretic.

27. The circuit of claim 25, wherein said first supply voltage is a positive supply voltage, and said third supply voltage is positive but smaller than said first supply voltage.

28. The circuit of claim 25, wherein said switching transistor is a DMOS transistor.

29. The circuit of claim 25, further comprising circuitry for switching said second capacitor in a feedback relation to provide constant-pulse-width control signals to said switching transistor.

30. A DC-to-DC converter, connected to receive power from two supply connections and to provide a power supply on an output node at a voltage different from both the power supply connections, comprising an inductor driven by a switch to cyclically charge, a discharge diode of the energy stored in the inductor on an output node, a capacitor connected between the output node and one or the other of the supply rails, and a control circuit for regulating the output voltage, which comprises a first comparator of the output voltage enabling and disabling the closing of said switch depending on whether the output voltage is lower or higher than a reference voltage and means, for controlling the switching of said switch, which comprises a second comparator of the voltage across said switch, generating a turn-off signal when said voltage rises above a preset value;

a third comparator of the discharge current of the inductor through said diode, generating a confirmation signal of an OFF state of said switch until the current through said diode has become null; and means for masking said turn-off signal until turn-on of said switch is enabled by said first comparator.

31. A converter as defined in claim 30, wherein said means for controlling the switching of said switch comprise a driving flip-flop having a set terminal connected to the output of a NOR gate having a first input connected to the output of said first comparator, a second input connected to the output of said third comparator and a third input connected to a reset terminal of said flip-flop and to the output of an AND gate having a first input connected to the output of said second comparator and a second input connected to the output of a delay circuit, the input of which is connected to an output of said driving flip-flop.

32. A voltage boosting converter according to claim 31, wherein said third input of said NOR gate, connected to the reset input of said flip-flop is directly connected to the output of said second comparator and wherein, said masking means of the turn-off signal generated by said second comparator are composed of a switch driven by the signal present on said output of the driving flip-flop for switching the non inverting input of said second comparator to the drain node of a MOS transistor constituting said switch during a conducting phase of said transistor and to a ground node during a non conducting phase of said transistor.

33. A converter as defined in claim 32, wherein said transistor is a DMOS transistor and said driving buffer stage comprises an output stage powered at a higher voltage than the supply voltage.

34. A converter as defined in claim 30, wherein said first comparator has a certain hysteresis.

35. A converter as defined in claim 30, wherein said switch is constituted by a transistor and by a driving buffer stage.

36. A converter as defined in claim 35, wherein said transistor is a DMOS transistor and said driving buffer stage comprises an output stage powered at a higher voltage than the supply voltage.

37. A converter as defined in claim 36, wherein said higher voltage is derived, after a start-up transient, from the voltage generated on the output node of the converter.

38. A DC-to-DC converter having a power circuit comprising an inductor driven by a switch to cyclically charge, a discharge diode of the energy stored in the inductor on an output node and a capacitor connected between the output node and one or the other of the supply rails, and a control circuit for regulating the output voltage, which comprises at least a first comparator of the output voltage enabling and disabling the closing of said switch depending on whether the output voltage is lower or higher than a reference voltage and means for controlling of said switch, characterized in that said means comprise

- a second comparator of the voltage on a sensing resistance connected in series with said switch with a reference voltage, generating a turn-on or turn-off signal of said switch;
- a third comparator of the discharge current of the inductor through said diode, generating a confirmation signal of a turn-off state of the switch until the current through the diode has become null;
- the output signal of said three comparators being input to a NOR gate, having an output connected to a set input of a driving flip-flop of the switch and the signal of said second comparator being directly input to a reset terminal of said driving flip-flop.

39. A converter as defined in claim 38, wherein said first comparator has a certain hysteresis.

40. A converter as defined in claim 38, wherein said switch is constituted by a transistor and a driving buffer stage.

41. A converter as defined in claim 40 characterized by being a voltage step-up converter.

42. A converter as defined in claim 41, wherein said transistor is a DMOS transistor as said driving buffer stage comprises an output stage powered at a higher voltage than the supply voltage.

43. A converter as defined in claim 41, wherein said higher voltage is derived, after a start-up transient, from the voltage generated on an output node by the converter.

44. A converter as defined in claim 40, configured as a voltage step-down converter.

45. A method for operating a voltage conversion circuit to generate on an output node a third power supply voltage from first and second power supply voltages, using an inductor, a switching transistor configured to drive current through said inductor from first and second supply voltages, and an output diode connected between one terminal of said inductor and one of said supply voltages, comprising the steps of:

- monitoring the voltage of said output node, substantially continually, using a first comparator;
- monitoring the voltage of a node intermediate between said inductor and said diode, substantially continually, using a second comparator;
- monitoring the current through the output diode, substantially continually, using a third comparator;
- intermittently turning on said switching transistor, to increase the voltage drop across said inductor, for a duration determined by said second comparator, only when said third comparator indicates that current through said inductor and said output diode has ceased while said first comparator indicates that additional current through said output diode is needed.

46. The method of claim 45, wherein said first comparator is hysteretic.

* * * * *